(12) United States Patent
Lim

(10) Patent No.: US 6,430,223 B1
(45) Date of Patent: Aug. 6, 2002

(54) MOTION PREDICTION APPARATUS AND METHOD

(75) Inventor: Kyoung Won Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/182,194

(22) Filed: Oct. 30, 1998

(30) Foreign Application Priority Data

Nov. 1, 1997 (KR) .............................................. 97-57610

(51) Int. Cl.[7] .................................................. H04N 7/32
(52) U.S. Cl. .................................................. 375/240.16
(58) Field of Search ........................... 348/402.1, 407.1, 348/413.1, 416.1, 699; 375/240.12–240.17, 240.24; 382/232, 236, 238

(56) References Cited

U.S. PATENT DOCUMENTS

| | | | | |
|---|---|---|---|---|
| 4,937,666 A | * | 6/1990 | Yang ........................ | 348/413.1 |
| 5,227,878 A | * | 7/1993 | Puri et al. ............... | 375/240.15 |
| 5,398,079 A | * | 3/1995 | Liu et al. ................ | 348/699 |
| 5,408,269 A | * | 4/1995 | Tsukagoshi ............ | 375/240.17 |
| 5,488,419 A | * | 1/1996 | Hui et al. ............... | 375/240.17 |
| 5,489,949 A | * | 2/1996 | Jeong et al. ............ | 348/699 |
| 5,493,344 A | * | 2/1996 | Yu ............................ | 375/240.14 |
| 5,587,741 A | * | 12/1996 | Kim ........................ | 375/240.17 |
| 6,160,849 A | * | 12/2000 | Igarashi et al. ........ | 375/240.14 |

* cited by examiner

Primary Examiner—Richard Lee
(74) Attorney, Agent, or Firm—Fleshner & Kim, LLP

(57) ABSTRACT

A motion prediction apparatus and method that is capable of preventing the redundancy of calculation occurring during a motion prediction. In the apparatus, a first motion estimator predicts a single-pixel motion in a top-to-top field path and in a bottom-to-bottom field path with respect to an input image by retrieving a previous image. A frame vector determining circuit determines a frame motion vector on a basis of a motion vector outputted from the first motion estimator. A scaler scales each motion vector outputted from the first motion estimator to determine a field motion vector in a different path. A second motion estimator predicts a motion in a half pixel unit by retrieving a decoded image on a basis of each single-pixel motion vector outputted from the first motion estimator, the frame vector determining circuit and the scaler. The apparatus can reduce a calculation amount required for a motion prediction in a single pixel unit to ¼ compared with the prior art.

24 Claims, 12 Drawing Sheets

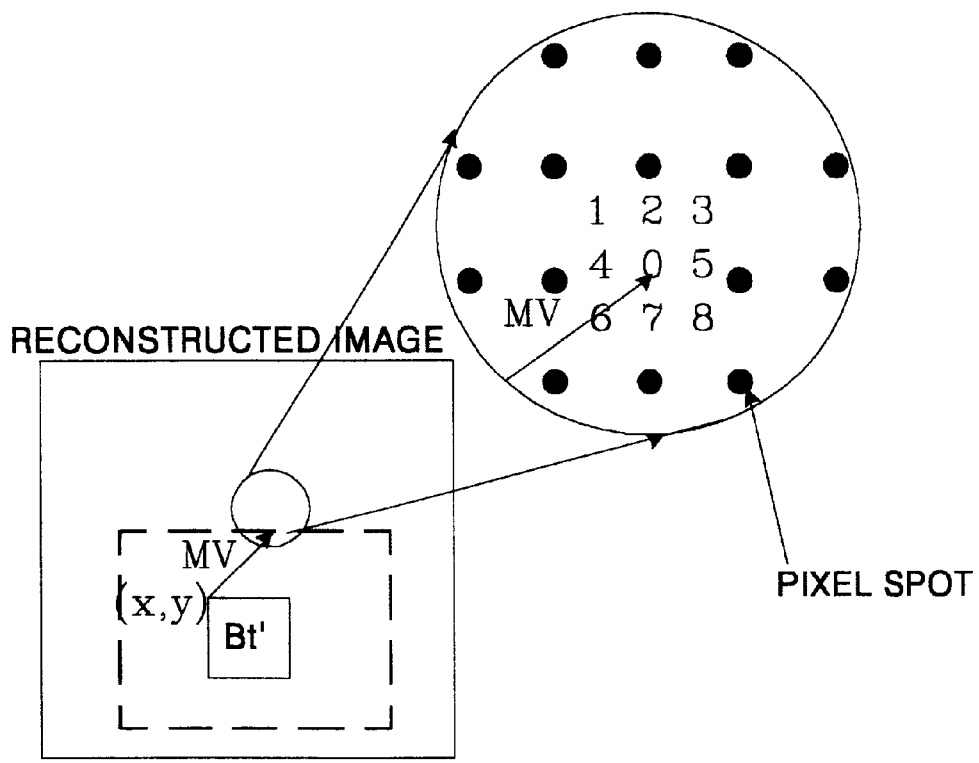

FIG.7A
RELATED ART
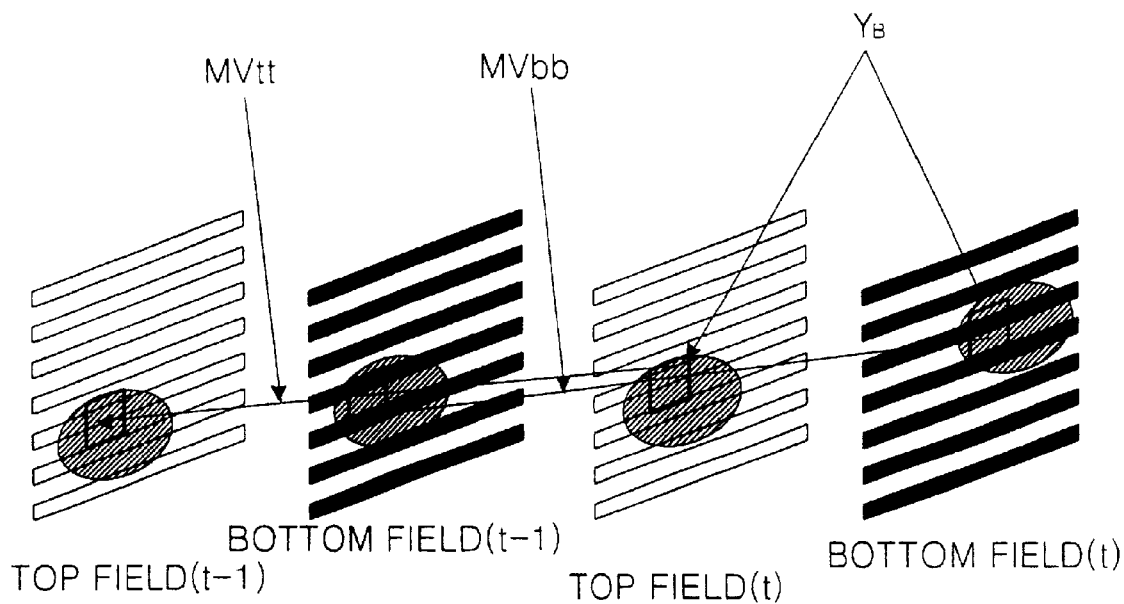
FIG.7B
RELATED ART
FIG.7C
RELATED ART
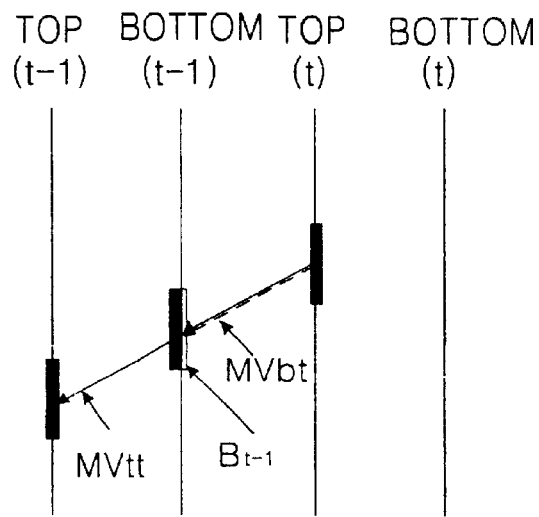
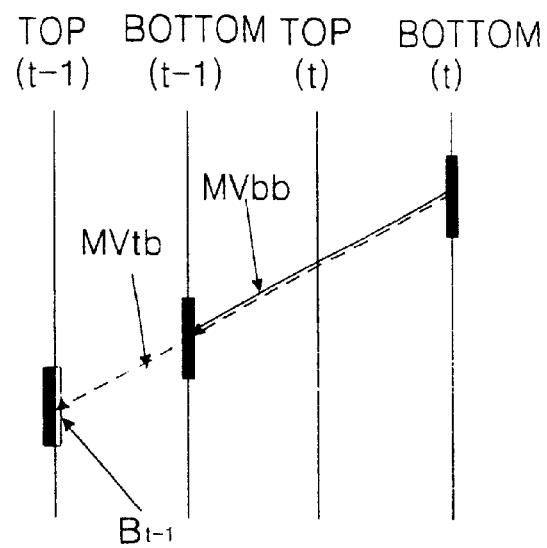

FORWARD

FORWARD    BACKWARD

FIG.11A
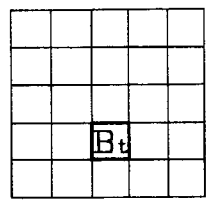
INPUT IMAGE
LAYER2
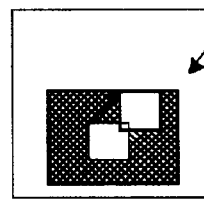
PREVIOUS IMAGE MSA2
LAYER2
FIG.11B
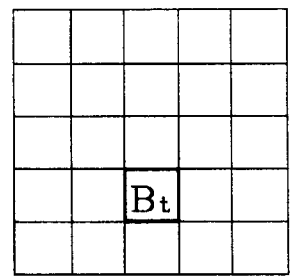
LAYER1
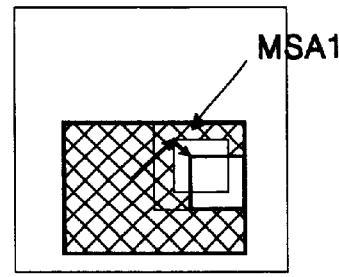
MSA1
LAYER1
FIG.11C
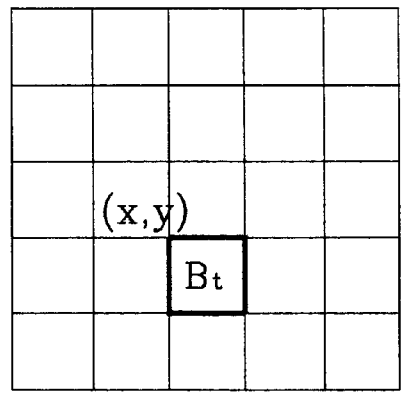
LAYER0
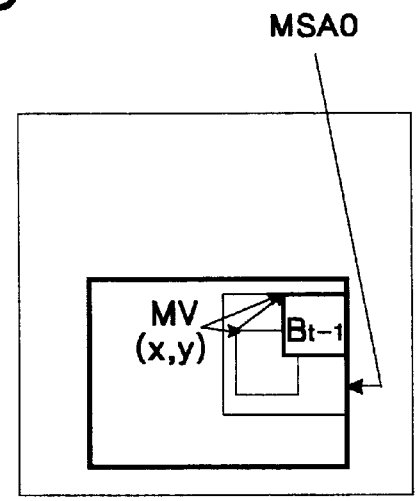
MSA0
LAYER0

MOTION PREDICTION APPARATUS AND METHOD

BACKGROUND OF THE INVENTION

1. Field of the Invention

This invention relates to a coding technique of a digital image, and more particularly to a motion prediction apparatus and method which is adapted to prevent the calculation redundancy occurring during predicting a motion in coding a digital image.

2. Description of the Related Art

There has been required an information compressing method so as to process a large quantity of information resulting from a tendency of multimedia in the recent communication media. Accordingly, various information compressing technique has been developed. The typical information compressing method includes the MPEG (Moving Picture Experts Group)-2 which is an international standard of the moving picture compressing method.

Generally, the macro block is a basic unit for performing a signal compression in a coder of MPEG-2 system. One macro block consists of a brightness signal(Y) block having 16×16 pixels and a color-difference signal (Cr and Cb) block having 8×8 pixels.

The first step for the image compression is extracting the macro block from a certain input image. To this end, there is required three operations of the color space conversion, the chrominance component decimation and the block partitioning. The color space conversion is an operation for transform the input image into Y, Cr and Cb space so as to reduce the redundancy of red(R), green(G) and blue(B) input from a camera to be converted into a digital shape. The color-difference signal decimation refers to decimating the color-difference signals Cr and Cb in the horizontal and vertical direction because the brightness signal Y has such a wide frequency band that it is well recognized visually, whereas the recognition factor in the color-difference signal Cr or Cb representing the contrast colors is lower than that in the brightness signal Y. For example, in the case of a format image having a ratio 4:2:0, the respective decimation factors become a ratio of 2:1. The block partitioning is to divide Y, Cb and Cr images obtained through the color space conversion and the chrominance component decimation mentioned above into suitable for coding them. For example, the brightness signal Y is divided into a 16×16 pixel unit, and each color-difference signal Cr and Cb is divided into a 16×16 pixel unit.

The second step for the image compression is to provide a motion prediction and a compensation for the macro blocks extracted from the entire image regularly. Such motion prediction and compensation are intended to compress an image effectively by omitting the redundancy among the adjacent video images in the time base. The conventional motion prediction and compensation process will be explained with reference to a coder of MPEG-2 system shown in FIG. 1 below.

FIG. 1 is a block diagram showing a typical coder of MPEG-2, In FIG. 2, the MPEG-2 system coder includes a frame memory 2 connected to an input line 1, a frame delay 18 for storing a decoded image, and a motion estimator 20 connected to the input line 1, the frame memory 2 and the frame delay to perform an operation for predicting and compensating for a motion of an input image.

In the coder shown in FIG. 1, the frame memory 2 serves to store an image received over the input line 1 in the frame unit. The motion estimator 20 predicts and compensates a motion of the input image. To this end, the motion estimator 20 is comprised of a first motion estimator 22 connected to the input line 1 and the frame memory 2 commonly, a second motion estimator 24 connected to the input line, the first motion estimator 22 and the frame delay 18, and a motion compensator 26 connected to the second motion estimator 24 and the frame delay 18. The first motion estimator 22 detects a position of the most analogous block to the previous image stored in the frame memory 2 with respect to the brightness signal(Y) block in a certain macro block from the image signal received over the input line 1. The detected block position is employed as a reference position for the second motion estimator 24. The second motion estimator 24 receives the input image inputted over the input line 1 and a reconstructed image stored in the frame delay 18 to detect the most analogous block to the brightness signal (Y) block in the macro block with respect to a reference position inputted from the first motion estimator 22 from the reconstructed image. Then, the MPEG-2 system coder transfers the detected position to a decoder, so that the decoder can obtain an image identical to the reconstructed image referred in the coder on a basis of the received position information. The motion compensator 26 extracts the most analogous block to the macro block from the reconstructed image stored in the frame delay 18 on a basis of the final position information generated at the second motion estimator 24.

The MPEG-2 system coder further includes a subtractor 4 connected to the frame memory 2 and the motion compensator 26 commonly to generate a difference image between the previous image and the estimated reconstructed image, a coder 34 connected to the subtractor 4 to code the difference image, a decoder 36 connected to the coder 34 to reconstruct the coded difference image, and an adder 16 connected to the decoder 36 and the image compensator 26 to add the reconstructed difference image and the estimated image and output the added image to the frame delay 18. Moreover, The MPEG-2 system coder includes a variable length coder(VCL) and a buffer 32 that is connected, in series, to the coder 34, and a bit rate controller 10 for controlling a bit generation rate by adjusting quantizing step sizes Qp of a quantizer 8 and a dequantizer 12 with reference to a characteristic of an input image stored in the frame memory 2 and a data quantity of the buffer 32.

In such a configuration, the subtractor generates a difference image between a macro block of the previous image stored in the frame memory 2 and a macro block of the estimated reconstructed image from the motion compensator 26 and output the difference image to the coder 34. In other words, the subtractor outputs a difference image in which a redundancy between images adjacent to each other in the time base is eliminated. The coder 34 carries out the discrete cosine transform(DCT) processing for the difference image inputted from the subtractor 4 to code the difference image, thereby eliminating the space area co-relationship existing in the difference image. To this end, the coder 34 further includes a DCT circuit 6 for carrying out a DCT operation of the difference image in an 8×8 pixel unit, and a quantizer 8 for quantizing the DCT transformed signal. The VCL 30 is connected to the quantizer 8 to compress and output the coded difference image again in accordance with a value of code generation probability. The buffer 32 is connected to the VCL 30 to output a bit stream of the difference image in the first-in first-out system. The decoder 36 connected to the quantizer 8 reconstructs the coded difference image by carrying out an operation similar to the image reconstruction process performed at the coder. To this end, the decoder 36 includes an inverse quantizer connected, in series, to the quantizer 8 to inverse-quantize the coded difference image, and an inverse discrete cosine transform(IDCT) circuit for reconstructing the difference image by carrying out the IDCT operation. The adder 16 adds the difference image reconstructed at the IDCT circuit 14 to the estimated image from the motion compensator 26 and outputs the added image to the frame delay 18. Accordingly, the frame delay 18 stores a new reconstructed image for estimating an image to be inputted in the next order, thereby utilizing for the purpose of predicting and compensating for a motion at the motion estimator 20.

Since the above-mentioned conventional motion estimator 20 performs a redundant motion prediction at the first and second motion estimator, it has a disadvantage in that the complication in the coder was raised. A detailed explanation as to the problem will be described with reference to FIG. 2 to FIG. 5 below.

FIG. 2 shows the configuration of a previous frame t−1 and a current frame t displayed by the interlaced format pattern. Generally, one frame displayed by the interlaced format pattern is constructed in the shape of combining a top field with a bottom field which are alternately generated every 1/60 second. Accordingly, all operations are carried out with being divided into each field unit in order to perform an image compression effectively. The moving picture compressing method of MPEG-2 system predicts a motion for the field as well as the frame image so that it is applicable to an image in the interlaced format pattern effectively.

FIG. 3 is a detailed block diagram showing the configuration of the first and second motion estimators 22 and 24 in the motion estimator 20 of FIG. 1. Each of the first and second motion estimators 22 and 24 simultaneously carry out a motion prediction operation with respect to five paths, i.e., frame, top-to-top, bottom-to-top, top-to-bottom and bottom-to-bottom paths. The first motion estimator 22 makes use of the input image and the previous image to perform a motion prediction in a single pixel unit with respect to the five paths. In this case, an image corresponding to a retrieval area is the previous image stored in the frame memory 2. The first motion estimator 22 makes use of a block matching algorithm for each five-path to predict a motion in the single pixel unit, thereby detecting a motion vector MV. The block matching algorithm refers to a process in which the most analogous block to a specified block of the input image is found from the previous image. The second motion estimator 24 predicts a motion in a half pixel unit on a basis of the single pixel unit of motion vector MV inputted from the first motion estimator 22. To this end, the second motion estimator 24 includes a half-pixel motion vector detector 21, first and second multiplexors 23 and 25, a second adder 27 and a field/frame determining circuit 29. In such a second motion estimator 24, the half-pixel motion vector detector 21 detects a motion vector in the half pixel unit on a basis of each motion vector MV in the single pixel unit for the five paths inputted from the first motion estimator 22. In this case, the used retrieval area is a reconstructed image stored in the frame delay 18 in FIG. 1. The first multiplexor 23 selectively switches a motion vector in the top-to-top path and a motion vector in the bottom-to-top path which are detected at the half-pixel motion vector detector 21, and outputs it to the adder 27. In this case, the switching of the first multiplexor 23 is determined by comparing a motion detection error in the top-to-top path with a motion detection error in the bottom-to-top path. The second multiplexor 22 selectively switches a motion vector in the top-to-bottom path and a motion vector in the bottom-to-bottom path which are detected at the half-pixel motion vector detector 22. The switching of the second multiplexor 25 also is determined by comparing a motion detection error in the top-to-bottom path with a motion detection error in the bottom-to-bottom path. Then, the adder 27 adds half-pixel motion detection errors between the fields outputted from the first and second multiplexors 23 and 25 and outputs the added motion detection error to the field/frame determining circuit 29. The field/frame determining circuit 29 compares a half-pixel pixel motion detection error between the frames outputted from the half-pixel motion vector detector 21 with that between the fields outputted from the adder 27 to select a motion vector having the smaller motion detection error value, and outputs the selected motion vector to the motion compensator 26 shown in FIG. 1. In other words, the second motion estimator 24 compares a motion compensation error generated when a motion was predicted in a frame unit with a motion compensation error generated when a motion was predicted in a field unit to select and output the smaller error. For example, the case where a picture is suddenly changed between the fields like a sports image corresponds to the case where a motion compensation error in the field unit is smaller.

FIGS. 4A and 4B depict a motion prediction method in the half-pixel unit employing a block matching algorithm. FIG. 4A represents an input image $I_t$, and FIG. 4B does the previous image $I_{t-1}$. In the input image $I_t$, the size $N_B$ of a specified block $B_t$. First, a local area for finding a block analogous to the specified block $B_t$ at the reference position (x,y) in the input image $I_t$ is determined in the previous image $I_{t-1}$. In this case, it is assumed that a local area determined in the previous image $I_{t-1}$ has a size of x−S~x+S+$N_B$−2 in the horizontal direction; while having a size of y−S~y+S+$N_B$−2 in the vertical direction, on a basis of the reference position (x,y). Herein, S is a parameter defining a size of the retrieval area. Next, the mean absolute difference (MAD) is used as a criterion for finding the most analogous block to the specified block $B_t$ of the input image $I_t$ in the local area of the previous image $I_{t-1}$. In other words, a MAD between a certain block $B_{t-1}$ and a specified block $B_t$ having a size of $B_t \times B_t$ is calculated at every certain position (u,v) in the local area of the previous image $I_{t-1}$. This MAD can be given from the following formula:

$$MAD(u, v) = \frac{1}{N_B \times N_B} \sum_{i=0}^{i=N_B-1} \sum_{j=0}^{j=N_B-1} |B_t(x-i, y-i) - B_{t-1}(x-i-u, y-j-v)| \quad (1)$$

wherein B(x−i,y−j) represents a pixel of the specified block $B_{t1}$ with respect to a reference position (x,y) in the input image $I_t$. Subsequently, a position ((u,v)*) of a block $B_{t-1}$ having the smallest MAD in the previous image $I_{t-1}$ is detected. Herein, a displacement from a reference position (x,y) of the input image $I_t$ until a position ((u,v)*) of the previous image $I_{t-1}$ is referred as to "a motion vector MV in the half-pixel unit". Further, in order to obtain a vector MV in a single pixel unit from the formula (1) for calculating the MAD, it is necessary to provide an exponentially increasing calculation with respect to each field/frame path like the following formula:

Frame: $N_B \times N_B \times 2S \times 2S \times M$

Top-to-top, Bottom-to-top,
Top-to-bottom and bottom-to-bottom fields:

$$4 \times N_B \times \frac{N_B}{2} \times 2S \times \frac{2S}{2} \times M \quad (2)$$

wherein M represents a calculation amount required in a calculation of MDA per unit pixel. Thus, it should be understood that, when S is large, that is, when a retrieval area is large, a motion prediction in the single pixel unit does not become easy, because a calculation of $2 \times N_B \times N_B \times 2S \times 2S \times M$ is needed as a whole so as to obtain the motion vector MV in a single pixel unit.

FIG. 5 depicts the conventional method of predicting a motion in a half-pixel unit. Herein, the motion prediction refers to detecting the position of a block having the smallest error with respect to 9 half-pixels positioned at ±0.5 point on a basis of the motion vector MV in a single pixel unit detected at the first motion estimator 22. The position of the block having the smallest error can be detected by making use of the block matching algorithm in a similar manner to the above-mentioned motion prediction method in a single pixel unit. Each of blocks corresponding to the 9 half-pixel position based on the motion vector in a single pixel unit can be calculated by the following formula:

Retrieval positions 4, 5: $I(u\pm0.5,v)=\{I(u,v)+I(u\pm1,v)\}/2$

Retrieval positions 2, 7: $I(u,v\pm0.5)=\{I(u,v)+I(u,v\pm1)\}/2$

Retrieval positions 1, 3, 6, 8: $I(u\pm0.5, v\pm0.5)=\{I(u,v)+I(u,v\pm1)+I(u\pm1,v)+I(u\pm1,v\pm1)\}/4$ (3)

wherein (u,v) represent the co-ordinates for the motion vector in a single pixel unit.

Further, a calculation amount used when a motion in a half-pixel unit with respect to each five path is predicted by applying the formula (3) can be seen from the following formula:

Frame: $N_B \times N_B \times 8 \times (M+L)$

Top-to-top, Bottom-to-top,
Top-to-bottom and bottom-to-bottom fields $$N_B \times \frac{N_B}{2} \times 8 \times (M + L) \quad (4)$$

wherein L represents a calculation amount required in making one pixel in a half-pixel position. The entire calculation amount required for a motion prediction in a half-pixel unit from the formula (4) is and which can be disregarded in comparison to a calculation needed in a motion prediction process in a single pixel unit.

As described above, the conventional motion estimators 22 and 24 has carried out a redundant motion prediction for five paths(i.e., frame, and top-to-top, bottom-to-top, top-to-bottom and bottom-to-bottom fields), so that it becomes possible to predict more analogous block from the reconstructed image. However, the conventional motion prediction scheme has drawbacks in that it not only raises the complication of the coder due to the redundancy of calculation for a motion prediction, but also requires greater hardwares when it is implemented with a very large scale integrated circuit(VLSI). Particularly, a calculation for the motion prediction in a single path needs a lot of calculation amount as well as complex hardwares in the case of the first motion estimator 22, thereby raising the complication due to a redundant motion prediction operation for the five paths.

SUMMARY OF THE INVENTION

Accordingly, it is an object of the present invention to provide a motion prediction method and apparatus that is capable of reducing a calculation amount by eliminating the redundant calculation in a motion prediction process in a single pixel unit.

Further object of the present invention is to provide a motion prediction apparatus and method that is capable of reducing the complication of hardwares by eliminating the redundant calculation in a motion prediction process in a single pixel unit.

Still further object of the present invention is to provide a motion prediction apparatus and method that can prevent a deterioration in a motion prediction performance due to a reduction in a calculation amount.

In order to achieve these and other objects of the invention, a motion prediction apparatus according to one aspect of the present invention includes first motion estimating means for retrieving a previous image to predict a single-pixel motion in a top-to-top field path and in a bottom-to-bottom field path with respect to the input image; frame vector determining means for determining a frame motion vector on a basis of a motion vector outputted from the first motion estimating means; scaling means for scaling each motion vector outputted form the first motion estimating means to determine a field motion vector in a different path; and second motion estimating means for retrieving a decoded image on a basis of each single-pixel motion vector outputted from the first motion estimating means, the frame vector determining means and the scaling means.

A motion prediction method according to another aspect of the present invention includes the steps of (A) detecting motion vectors by retrieving a previous image to predict motions in a single pixel unit in a top-to-top field path and in a bottom-to-bottom field path with respect to the input image; (B) determining field motion vectors for two different paths by determining a frame motion vector on a basis of the field motion vectors and scaling each of the field; and (C) detecting a motion vector in a half pixel unit by retrieving a decoded image on a basis of the motion vectors in the steps (A) and (B).

A motion prediction method according to still another aspect of the present invention includes the steps of (A) detecting a single-pixel motion vector by repeatedly predicting a motion in a single pixel unit hierarchically with respect to a top-to-top field path and a bottom-to-bottom field path of an input image and a previous image consisting of n(n≧2) layers having a different size of retrieval areas, said n being an integer; (B) determining field motion vectors for two different paths by determining a frame motion vector on a basis of the field motion vectors and scaling each of the field motion vectors; (C) detecting a final single-pixel motion vector at the lowermost layer by repeatedly predicting a motion in a single pixel unit hierarchically at m(1≦m<n) layers next to the certain layer on a basis of the motion vectors in the steps (A) and (B); and (D) predicting a motion in a half pixel unit by retrieving a decoded image on a basis of the single-pixel motion vector detected in the step (C).

A motion prediction method according to still another aspect of the present invention includes the steps of (A) detecting a single-pixel motion vector by repeatedly predicting a motion in a single pixel unit hierarchically with respect to a top-to-top field path and a bottom-to-bottom field path of an input image and a previous image consisting of $n(n \leq 2)$ layers having a different size of retrieval areas, said n being an integer; (B) determining field motion vectors for two different paths by determining a frame motion vector on a basis of the field motion vectors and scaling each of the field motion vectors; and (C) predicting a motion in a half pixel unit by retrieving the decoded image on a basis of the single-pixel motion vector detected in the steps (A) and (B).

BRIEF DESCRIPTION OF THE DRAWINGS

These and other objects of the invention will be apparent from the following detailed description of the embodiments of the present invention with reference to the accompanying drawings, in which:

FIG. 5 depicts the conventional motion prediction method in a half pixel unit;

FIG. 7 is a view for explaining a motion prediction method according to an embodiment of the present invention;

FIGS. 11A to 11C depict a single-pixel motion prediction method employing a hierarchical block matching algorithm;

DETAILED DESCRIPTION OF THE PREFERRED EMBODIMENT

Figure 1:
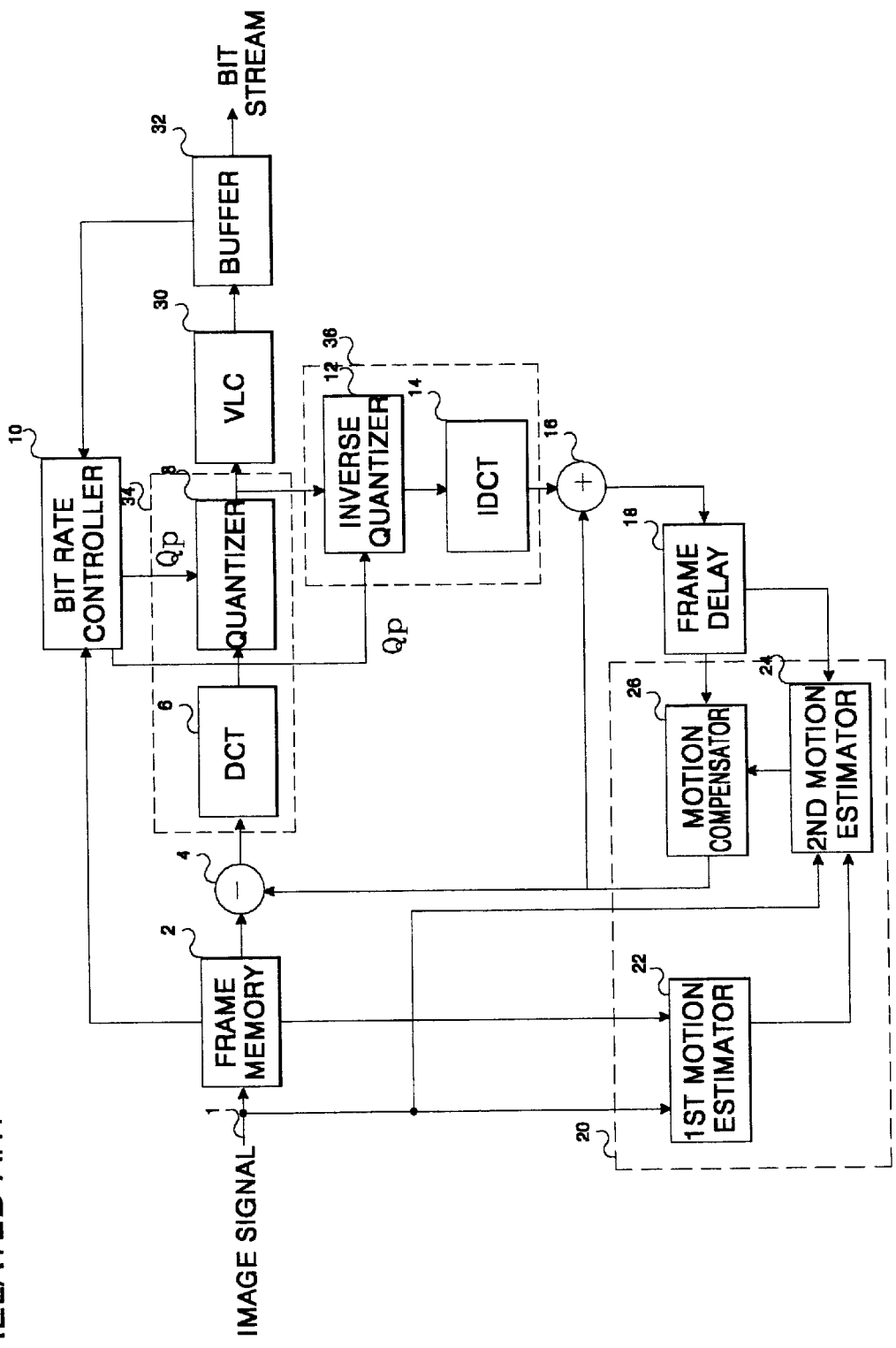
FIG. 1 is a block diagram showing the configuration of a conventional MPEG-2 system coder.
Figure 2:
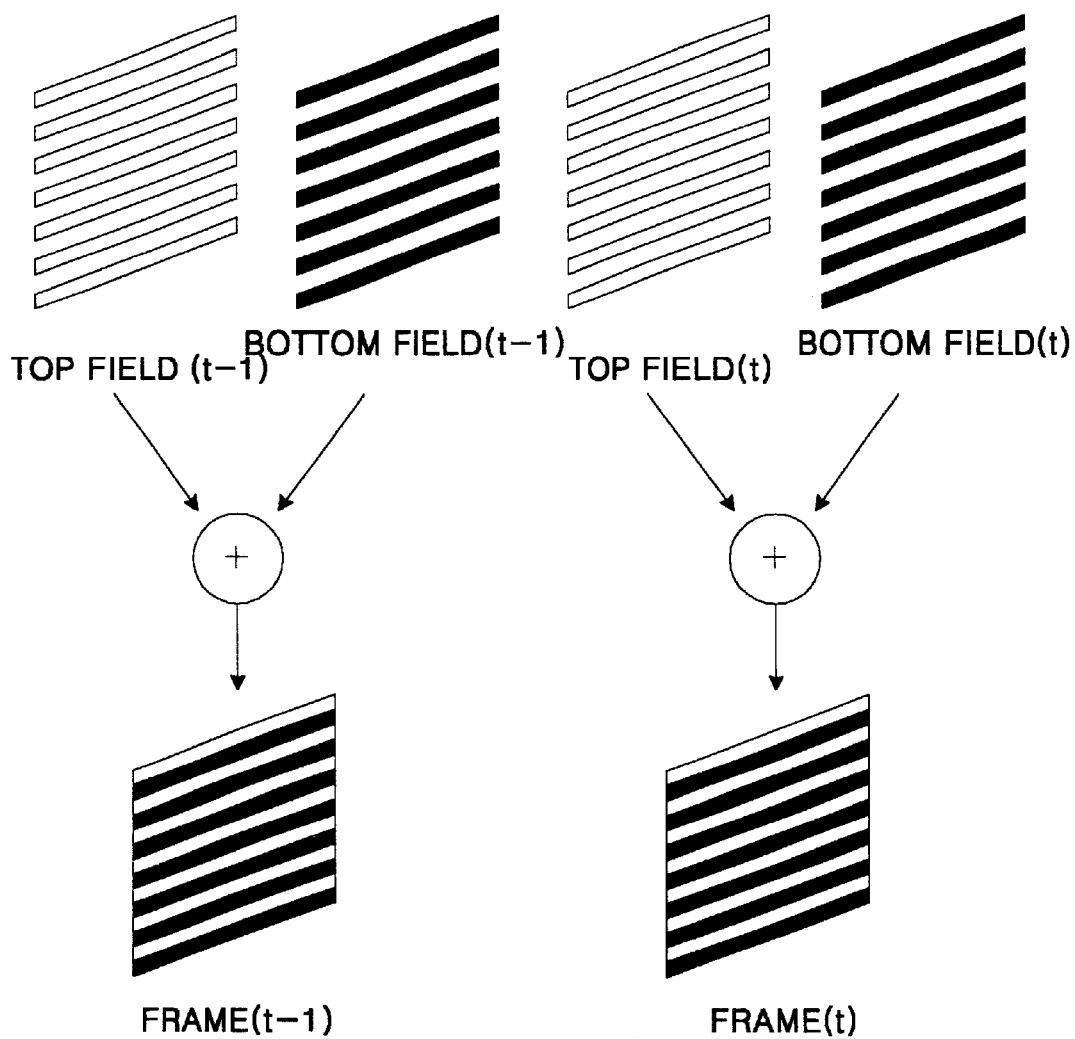
FIG. 2 illustrates the configuration of an input image and the previous image displayed by the conventional interlaced format pattern.
Figure 3:
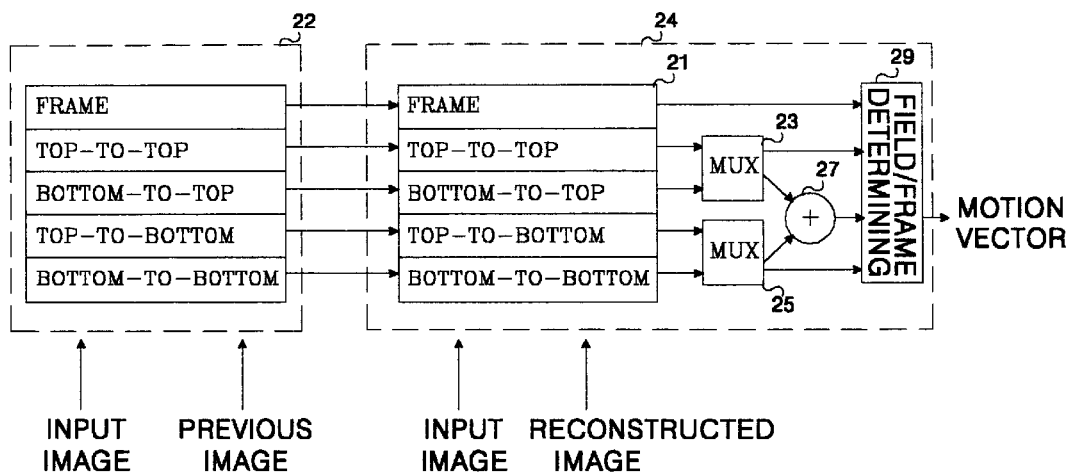
FIG. 3 is a detailed block diagram of the first and second motion estimator shown in FIG. 1.
Figure 4A:
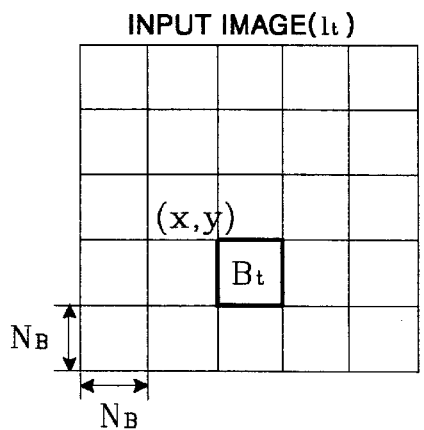
FIGS. 4A and 4B depict the conventional motion prediction method in a single pixel unit.
Figure 4B:
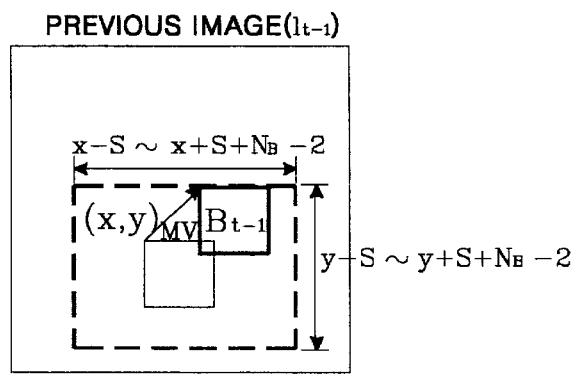
Figure 6:
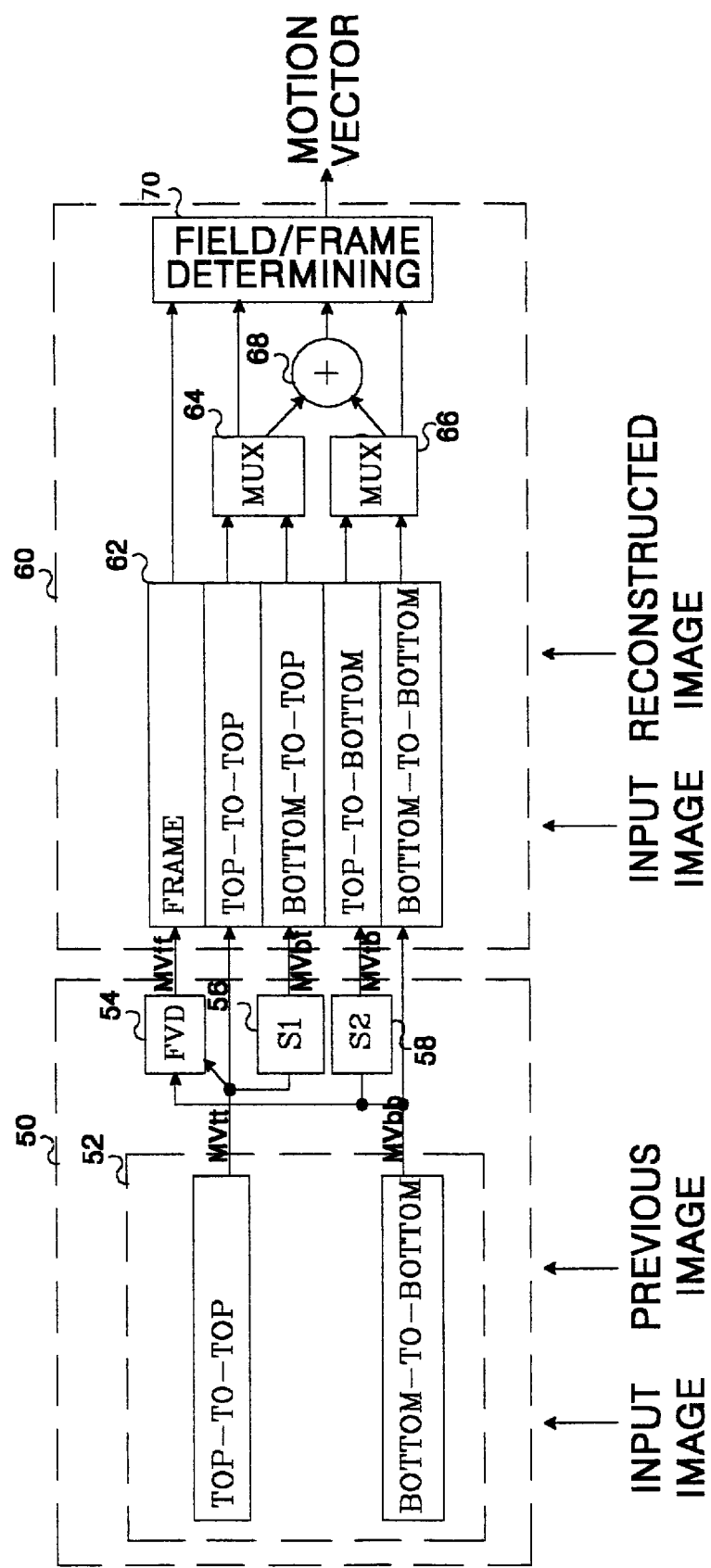
FIG. 6 is a block diagram showing the configuration of a motion prediction apparatus according to an embodiment of the present invention.

Referring to FIG. 6, there is shown a motion prediction apparatus according to an embodiment of the present invention. The motion prediction apparatus includes a first motion prediction estimator 50 for carrying out a motion prediction in a single pixel unit with respect to an input image, and second motion prediction estimator 60 for carrying out a motion prediction in a half pixel unit on a basis of a motion vector in a single pixel unit inputted from the first motion estimator 50.

In FIG. 6, the first motion estimator 50 includes a single-pixel motion vector detector for predicting a motion in a single pixel unit with respect to two field paths, a frame vector determiner(FVD) 54 for detecting a frame motion vector by making use of a vector motion vector from the single-pixel motion vector detector 52, and first and second scalers 56 and 58 for detecting a motion vector with respect to other field paths by employing a motion vector from the single-pixel motion vector detector 52. As shown in FIG. 7A, the single-pixel motion vector detector 52 predicts a motion for only a top field(t−1) of the previous image to a top field(t) of the input image path and a bottom field(t−1) of the previous image to a bottom field(t) of the input image path. Accordingly, the single-pixel motion vector detector 52 detects a motion vector MVtt of a top field(t−1) to a top field(t) path, hereinafter referred to as "first single-pixel motion vector", and a motion vector MVbb of a bottom field(t−1) to bottom field(t) path, hereinafter referred to as "second single-pixel motion vector". Herein, a specified block utilized for a motion prediction in a single pixel unit is a brightness signal(Y) block $Y_B$ included in a macro block. The FVD 54 detects an average vector of the first and second single-pixel motion vectors MVtt and MVbb inputted from the single-pixel motion vector detector 52, and outputs the detected average vector as a single pixel motion vector of a frame path MVff, hereinafter referred to as "third single-pixel motion vector". Otherwise, the FVD 54 may set any one of the first and second single-pixel motion vectors MVtt and MVbb to the third single-pixel motion vector MVff. Alternatively, the FVD 54 may calculate the third single-pixel motion vector MVff by giving a weight value depending on a motion information of each field to any one of the first and second single-pixel motion vectors MVtt and MVbb. The first scaler 56 scales the first single-pixel motion vector MVtt inputted from the single-pixel motion vector detector 52 in consideration of a time difference between the top field and the bottom field. Accordingly, the first scaler 56 predicts a motion in a single pixel unit with respect to a bottom field(t−1) of the previous image to a top field(t) of the input image path by employing the first single-pixel motion vector MVtt scaled as shown in FIG. 7A, thereby detecting a motion vector MVbt, hereinafter referred to as "fourth single-pixel motion vector". The second scaler 58 scales the second single-pixel motion vector MVbb inputted from the single-pixel motion vector detector 52 in consideration of a time difference between the top field and the bottom field. Accordingly, the second scaler 58 predicts a motion in a single pixel unit with respect to a top field(t−1) of the previous image to a bottom field(t) of the input image path by employing the second single-pixel motion vector MVbb scaled as shown in FIG. 7C, thereby detecting a motion vector MVtb, hereinafter referred to as "fifth single-pixel motion vector". Further, when the first and second single pixel motion vectors MVtt and MVbb is scaled, the first and second scalers 56 and 58 apply a different scaling weight depending on a picture type, a motion prediction direction(i.e., forward or backward) and a distance between the relevant fields by assuming a motion of an object between successive fields as shown in FIG. 7A as an equal velocity(or uniform) motion. A scaling weight applied in a different value depending on the picture type and the motion prediction direction will be described later.

In FIG. 6, the second motion estimator 60 includes a half-pixel motion vector detector 62, first and second multiplexors 64 and 66, a second adder 68, and a field/frame determining circuit 70, in similarity to the prior art. In such a configuration, the half-pixel motion vector detector 62 detects a motion vector in a half pixel unit with respect to five paths on a basis of each of the first to fifth single-pixel motion vectors MVtt, MVbb, MVff, MVbt and MVtb inputted from the above-mentioned first motion estimator 52. The first multiplexor 64 selectively switches a motion vector in a top-to-top path and a motion vector in a bottom-to-top path inputted from the half-pixel motion vector detector 62, and outputs the selected motion vector to the adder 68. In this case, the switching of the first multiplexor 64 is determined by comparing a motion detection error in the top-to-top path and a motion detection error in the bottom-to-top path. The second multiplexor 66 selectively switches a motion vector in a top-to-bottom path and a motion vector in a bottom-to-bottom path inputted from the half-pixel motion vector detector 62, and output the selected motion vector to the adder 68. In this case, the switching of the second multiplexor 66 is determined by comparing a motion detection error in the top-to-bottom path and a motion detection error in the bottom-to-bottom path. The adder 68 adds the half-pixel motion detection errors between the fields outputted from the first and second multiplexors 64 and 66, and outputs the added motion detection error to the field/frame determining circuit 70. The field/frame determining circuit 70 compares a half-pixel motion detection error between the frames outputted from the half-pixel motion vector detector 62 with that in the fields outputted from the adder 68 to thereby select and output a motion vector having the smaller motion detection error value. Accordingly, when an object in the picture is continuously moved over four fields as shown in FIG. 7A, that is, when it has a large motion, it becomes possible to provide a motion prediction efficiently.

An application of a different scaling weight according to the picture type and the motion prediction direction in the above-mentioned first and second scalers 56 and 58 will be explained with reference to FIG. 8 to FIG. 10 below.

Figure 8A:
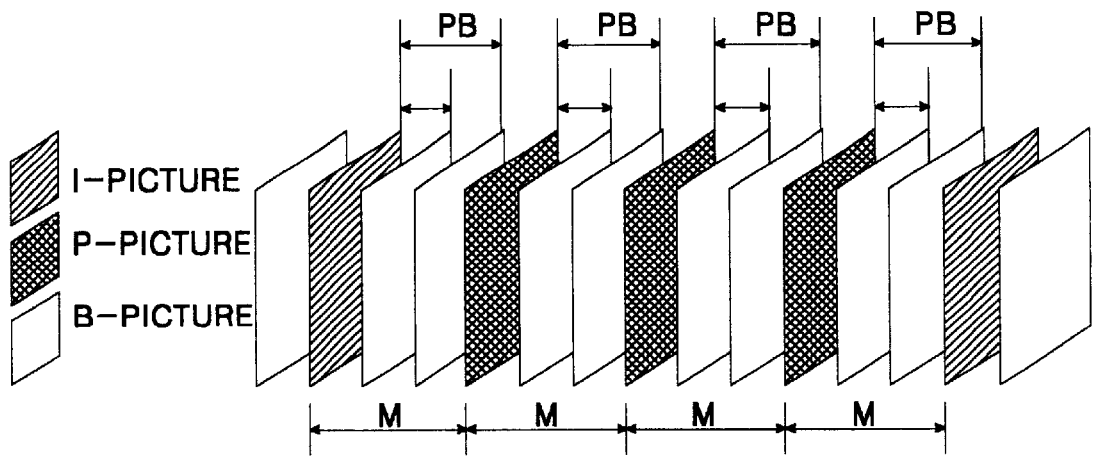
FIGS. 8A to 8C illustrate the conventional picture type and motion prediction direction.
Figure 8B:
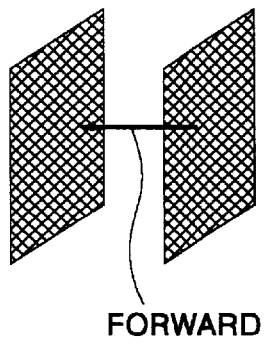
Figure 8C:
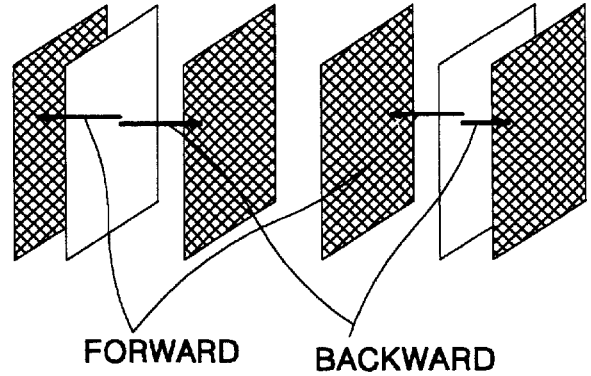

FIG. 8 illustrates the conventional picture type and motion prediction direction. Generally, a digital image of MPEG-2 system includes three types of pictures(i.e., I picture, P picture and B picture) as shown in FIG. 8A depending upon a motion compensation method. In FIG. 8A, the I picture(intra picture) is a coding image in the frame, and which does not provide a motion prediction and compensation for the I picture when each macro block in a picture is processed. The P picture(predictive picture) is a forward predicted coding image between the frames, and which provides a forward motion prediction and compensation as shown in FIG. 8B to thereby eliminate a redundancy in the time base when each macro block is processed. The I and P pictures of the previous image is used as a retrieval area for providing a motion prediction and compensation of the P picture. In this case, a frame space between the I picture and the P picture or between the P picture and P picture is defined by M, a value of which is varied in accordance with a characteristic of video image. For example, in FIG. 8A, M is 3. The B picture(bi-directionally predictive picture is a bi-directional predicted coding image, and which utilizes the previous I and P pictures and the next I and P pictures when the redundancy in the time base is eliminated with respect to each macro block in the picture. The motion prediction of the P picture is performed in the forward and backward direction as shown in FIG. 8C. An optimum image selected from an image predicted with the aid of a forward motion vector, an image predicted with the aid of a backward motion vector and an image interpolating the two predicted image is used for the motion compensation. In FIG. 8A, PB defines a frame space between the previous I and P picture and the B picture. Herein, a value of the PB for the first B picture is 1 and a value of the PB for the second B picture is 2.

Figure 9A:
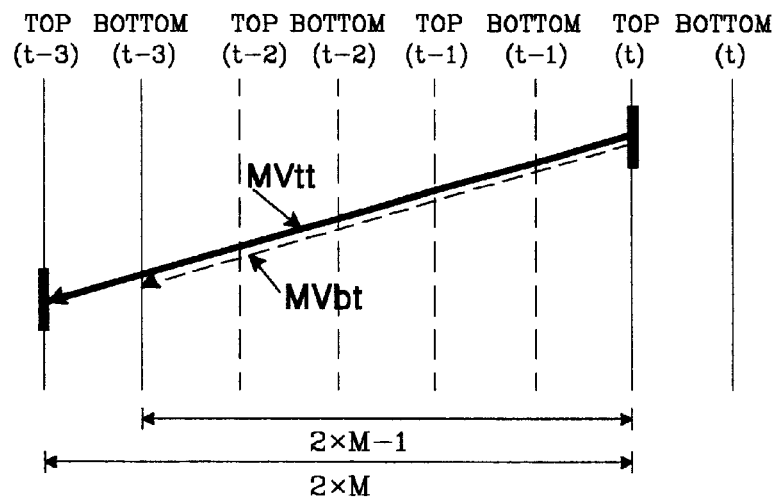
FIGS. 9A to 9C depict a method of scaling a motion vector in a top-to-top path.
Figure 9B:
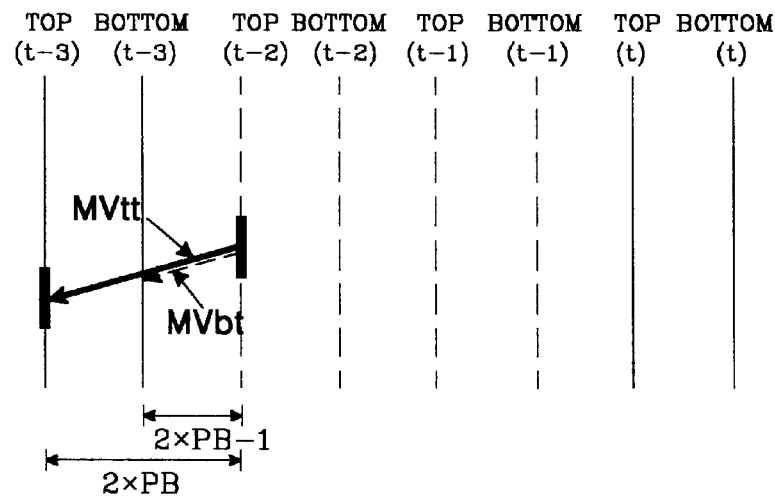
Figure 9C:
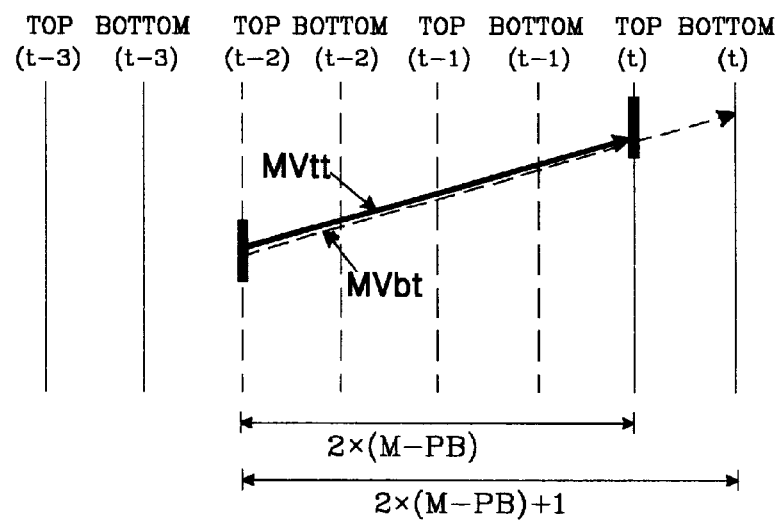

The first scaler 56 shown in FIG. 6 performs a motion vector scaling for applying the first single-pixel motion vector MVtt inputted from the single-pixel motion vector detector 52 to the half-pixel motion prediction in a bottom-to-bottom field path of the second motion estimator 60. FIGS. 9A to 9C depict examples of scaling the first single-pixel motion vector MVtt in the p picture and the B picture.

FIG. 9A represents a scaling method for doing a forward motion prediction of the P picture. Herein, it is to be noted that, since a frame space between the P picture and the previous I picture or P picture is M, a space between a top field(t−3) and a top field(t) becomes 2×M and a space between a bottom field(t−3) and a top field(t) becomes 2×M−1. Thus, a first scaling factor applied to the first single-pixel motion vector MVtt so as to obtain the fourth single-pixel motion vector MVbt during the forward motion prediction of the P picture is defined by the following formula:

$$F_{S1} = \frac{(2 \times M - 1)}{(2 \times M)} \tag{5}$$

FIG. 9B represents a scaling method for doing a forward motion prediction of the B picture. Herein, it is to be noted that a space between a top field(t−3) and a top field(t−2) becomes 2×PB and a space between a bottom field(t−3) and a top field(t−2) becomes 2×PB−1. Thus, a first scaling factor applied to the first single-pixel motion vector MVtt so as to obtain the fourth single-pixel motion vector MVbt during the forward motion prediction of the B picture is defined by the following formula:

$$F_{S1} = \frac{(2 \times PB - 1)}{(2 \times PB)} \tag{6}$$

FIG. 9C represents a scaling method for doing a backward motion prediction of the B picture. In the case of backward motion prediction, the frame space can be expressed by M−PB. Thus, a space between a top field(t) and a top field(t−2) related to the backward motion prediction becomes 2×(M−PB) and a space between a bottom field(t) and a top field(t−2) becomes 2×(M−PB)+1. Accordingly, a first scaling factor applied to the first single-pixel motion vector MVtt so as to obtain the fourth single-pixel motion vector MVbt during the backward motion prediction of the B picture is defined by the following formula:

$$F_{S1} = \frac{2 \times (M - PB) + 1}{2 \times (M - PB)} \tag{7}$$

The first scaler 56 calculates the fourth single-pixel motion vector MVbt using the above-mentioned first scaling factor $F_{s1}$ as seen from the following formula:

$$\overline{MVbt} = F_{S1} \times \overline{MVtt} \tag{8}$$

Figure 10A:
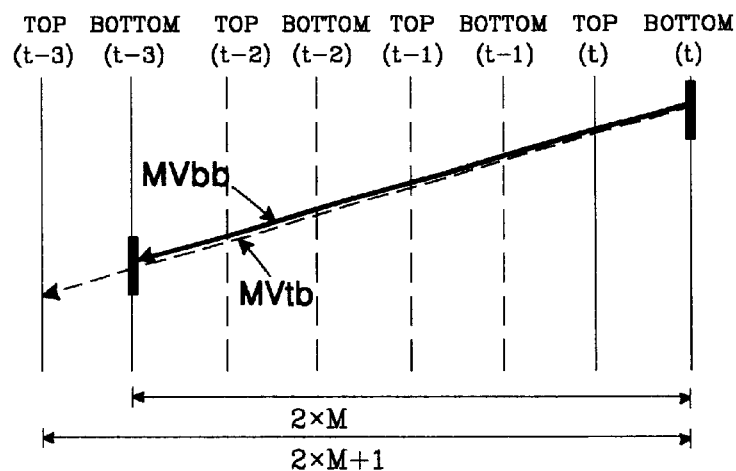
FIGS. 10A to 10C depict a method of scaling a motion vector in a bottom-to-bottom path.
Figure 10B:
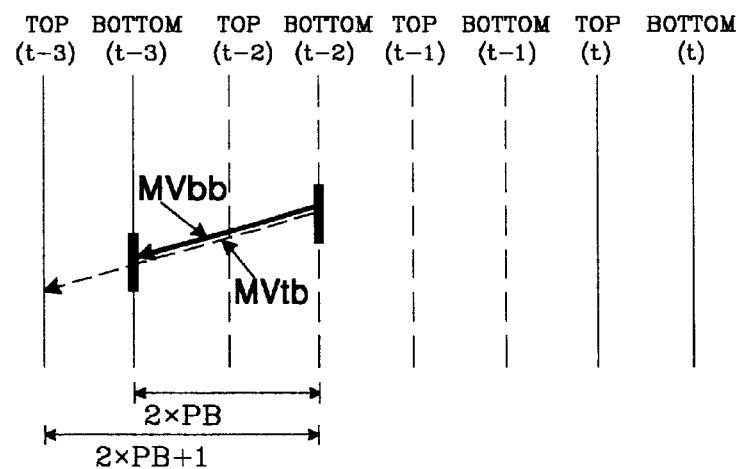
Figure 10C:
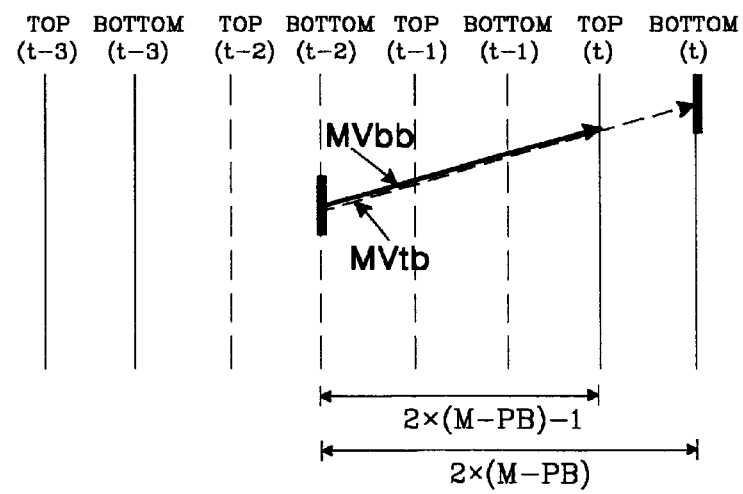

Further, the second scaler 58 shown in FIG. 6 performs a motion vector scaling for applying the second single-pixel motion vector MVbb inputted from the single-pixel motion vector detector 52 to the half-pixel motion prediction in the top-to-bottom field path. FIGS. 10A to 10C depict examples of scaling the second single-pixel motion vector MVtt in the p picture and the B picture.

FIG. 9A represents a scaling method for doing a forward motion prediction of the P picture. Herein, it is to be noted that a space between a bottom field(t−3) and a bottom field(t) related to the forward motion prediction of the P picture becomes 2×M and a space between a top field(t−3) and a bottom field(t) becomes 2×M+1. Thus, a second scaling factor applied to the second single-pixel motion vector MVtt so as to obtain the fifth single-pixel motion vector MVtb during the forward motion prediction of the P picture is defined by the following formula:

$$F_{S2} = \frac{(2 \times M + 1)}{(2 \times M)} \quad (9)$$

FIG. 10B represents a scaling method for doing a forward motion prediction of the B picture. Herein, it is to be noted that a space between a bottom field(t−3) and a bottom field(t−2) related to the forward motion prediction of the B picture becomes 2×PB and a space between a top field(t−3) and a bottom field(t−2) becomes 2×PB+1. Thus, a second scaling factor applied to the second single-pixel motion vector MVbb so as to obtain the fifth single-pixel motion vector MVtb during the forward motion prediction of the B picture is defined by the following formula:

$$F_{S2} = \frac{(2 \times PB + 1)}{(2 \times PB)} \quad (10)$$

FIG. 10C represents a scaling method for doing a backward motion prediction of the B picture. It is to be noted that a space between a bottom field(t) and a bottom field(t−2) related to the backward motion prediction of the B picture becomes 2×(M−PB) and a space between a top field(t) and a bottom field(t−2) becomes 2×(M−PB)−1. Accordingly, a second scaling factor applied to the second single-pixel motion vector MVbb so as to obtain the fifth single-pixel motion vector MVtb during the backward motion prediction of the B picture is defined by the following formula:

$$F_{S2} = \frac{2 \times (M - PB) - 1}{2 \times (M - PB)} \quad (11)$$

The second scaler 58 calculates the fifth single-pixel motion vector MVtb employing the above-mentioned second scaling factor $F_{s2}$ as seen from the following formula:

$$\overline{MVtb = F_{S2} \times MVbb} \quad (12)$$

As described above, the first and second scalers 56 and 58 scale the first and second single-pixel motion vectors MVtt and MVbb by applying a different scaling weight depending upon the picture type and the motion prediction direction, and a distance between field related to them, thereby detecting the fourth and fifth single-pixel motion vectors MVbt and MVtb.

When all positions in the motion prediction area are retrieved so as to provide the motion prediction in a single pixel unit, the motion prediction in a single pixel unit for a single path itself requires a tremendous calculation amount in accordance with an increase in the size of retrieval area. Accordingly, there have been developed various high-speed retrieval algorithms for reducing a calculation amount of the motion prediction of the single path itself. A typical example thereof is a hierarchical block matching algorithm. A motion prediction method employing the conventional hierarchical block matching algorithm will be described with reference to FIGS. 11A to 11C below.

FIGS. 11A to 11C illustrate an example of a hierarchical block matching algorithm consisting of three layers. A unit image is reconstructed into an image having a hierarchical structure for the hierarchical block matching algorithm. In FIGS. 11A to 11C, an l+1 layer image is an image obtained by filtering and sub-sampling an l layer image. The pixel number in the horizontal and vertical direction of the l+1 layer image is reduced to ½ compared with that of the l layer image. A motion prediction process in a single pixel unit employing such a hierarchical structure image will be explained below.

First, as shown in FIG. 11A, a motion prediction for an image in a smallest size of layer 2(l=2) are performed. Herein, it is to be noted that the size of an image in layer 2 is reduced to ¼ in the horizontal and vertical direction compared with that of the original image. The motion prediction method includes calculating and comparing block matching errors in an entire retrieval area MSA2 reduced to ¼ by utilizing a specified block Bt reduced in size as described above. Since a calculation amount required in this block matching method is proportional to a product of a square of unit block size and a square of retrieval area size, the motion prediction can be carried out by a calculation amount reduced to $(¼)^2 \times (¼)^2$ in the layer 2.

Next, as shown in FIG. 11B, a motion prediction for the layer 1(l=1) is performed. In this case, in order to improve an accuracy of a motion vector detected from an image in the layer 2, the block matching method is applied to only a local area MSA1 having a size added with ±2 pixels around a specified block $B_{l-1}$ based on the motion vector detected from the layer 2. Since the size of local area in an image of the layer 1 is negligibly small compared with the entire retrieval area, an accuracy of motion vector can be raised without an increase in the calculation amount in an image of the layer 1.

Subsequently, as shown in FIG. 11C, a motion prediction for an image in the layer 0(l=0) is performed. The motion prediction for an image in the layer 0 is carried out only for a local area MSA0 based on the motion vector detected from an image in the layer 1 in a similar manner to the motion prediction for an image in the layer 1. As a result, a final motion vector detected by applying such a hierarchical block matching algorithm becomes a sum of motion vectors obtained from images in each layer. Further, a motion vector in the upper layer is appropriately scaled up in conformity to a resolution of the lowermost layer.

Figure 12:
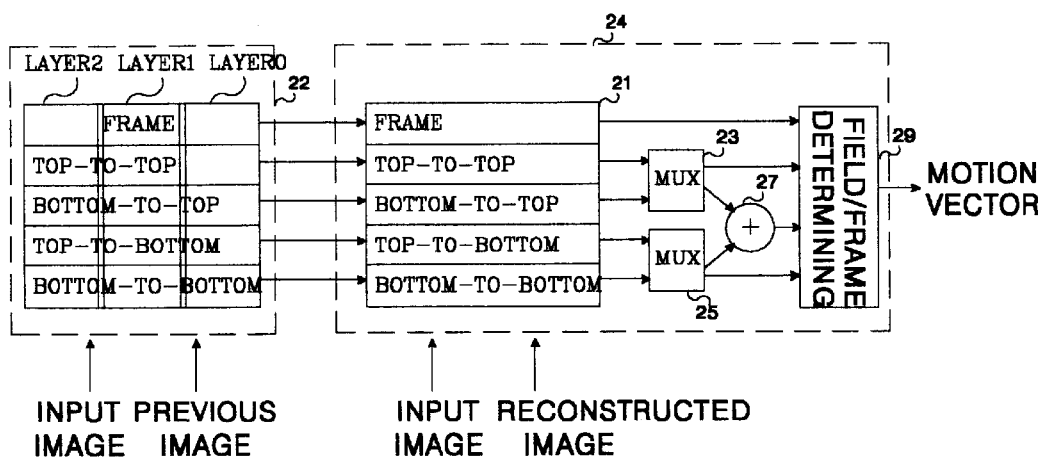
FIG. 12 is a block diagram showing the configuration of the conventional motion prediction apparatus employing a hierarchical block matching algorithm.

Referring now to FIG. 12, there is shown a conventional motion prediction apparatus employing the hierarchical block matching algorithm. The motion prediction apparatus includes a first motion estimator 22 for predicting a motion in a single pixel unit by utilizing the hierarchical block matching algorithm, and a second motion estimator for predicting a motion in a half pixel unit on a basis of a single-pixel motion vector inputted from the first motion estimator 22.

In the motion prediction apparatus shown in FIG. 12, the first motion estimator 22 carries out the motion prediction in a single pixel unit for three layers repeatedly by utilizing the above-mentioned hierarchical block matching algorithm, thereby detecting a final motion vector in a single pixel unit for five paths of the field/frame in an image of the lowermost layer 0. The second motion estimator 24 detects a motion vector in a half pixel unit on a basis of each final single-pixel motion vector for the five paths inputted from the first motion estimator 22. Accordingly, if a motion prediction in a half-pixel unit is regarded as one layer, a hierarchical retrieval technique for four layers is employed.

Motion prediction apparatus, to which the hierarchical block matching algorithm is applied, according to another embodiments will be described with reference to FIG. 13 to FIG. 15 below.

Figure 13:
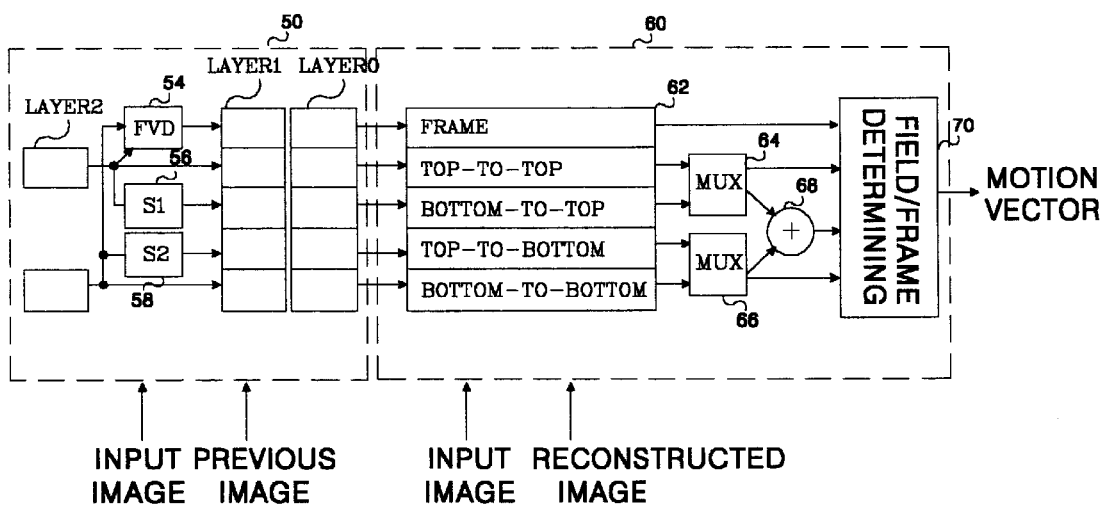
FIG. 13 is a block diagram showing the configuration of a motion prediction apparatus according to a second embodiment of the present invention.

Referring to FIG. 13, there is shown a motion prediction apparatus employing the hierarchical block matching algorithm according to a second embodiment of the present invention. In the motion prediction apparatus, a first motion estimator 50 detects a single-pixel motion vector by utilizing the hierarchical block matching algorithm. The first motion estimator 50 detects first and second single-pixel motion vectors with the aid of an image in the layer 2. Then, a frame vector detector 54 included in the first motion estimator 50 detects a third single-pixel motion vector on a basis of the first and second single-pixel motion vectors. First and second scalers 56 and 58 detects fourth and fifth single-pixel motion vectors by carrying out a motion scaling with respect to the first and second single-pixel motion vectors. Subsequently, the first motion estimator 50 performs the motion prediction hierarchically in the layers 1 and 0 by utilizing the first to fifth single-pixel motion vectors, thereby detecting the final first to fifth single-pixel motion vectors. The second motion estimator 60 detects a motion vector in a half pixel unit by utilizing the first to fifth single-pixel motion vectors inputted from the first motion estimator 50.

Figure 14:
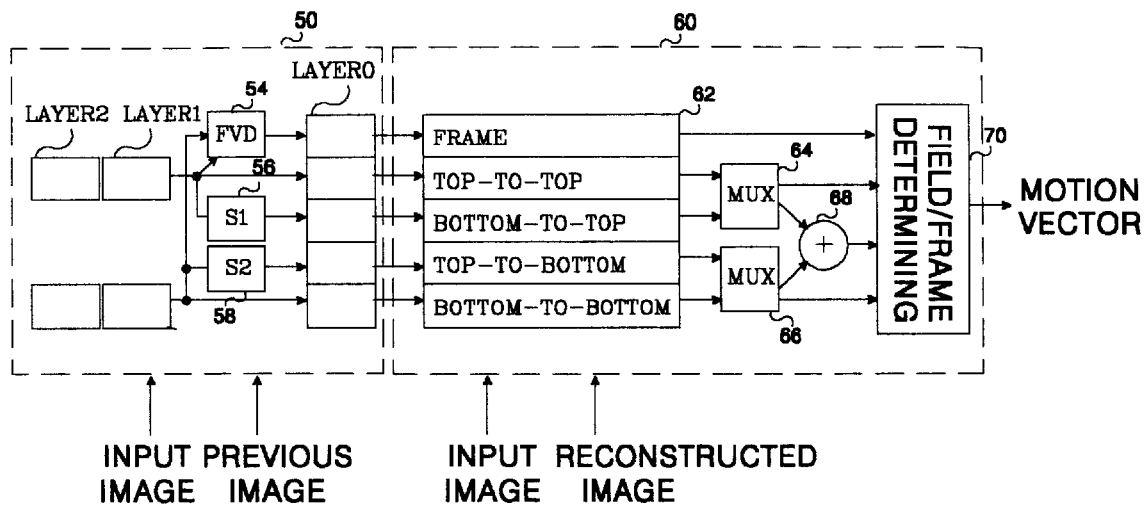
FIG. 14 is a block diagram showing the configuration of a motion prediction apparatus according to a third embodiment of the present invention.

Referring to FIG. 14, there is shown a motion prediction apparatus employing the hierarchical block matching algorithm according to a third embodiment of the present invention. In the motion prediction apparatus, a first motion estimator 50 detects a single-pixel motion vector by utilizing the hierarchical block matching algorithm. The first motion estimator 50 detects first and second single-pixel motion vectors by carrying out a motion prediction at the layers 2 and 1. Then, a frame vector detector 54 included in the first motion estimator 50 detects a third single-pixel motion vector on a basis of the first and second single-pixel motion vectors detected from the layer 1. First and second scalers 56 and 58 detects fourth and fifth single-pixel motion vectors by carrying out a motion scaling with respect to the first and second single-pixel motion vectors. Subsequently, the first motion estimator 50 performs the motion prediction in the layer 0 by utilizing the first to fifth single-pixel motion vectors, thereby detecting the final first to fifth single-pixel motion vectors. The second motion estimator 60 detects a motion vector in a half pixel unit by utilizing the first to fifth single-pixel motion vectors inputted from the first motion estimator 50.

Figure 15:
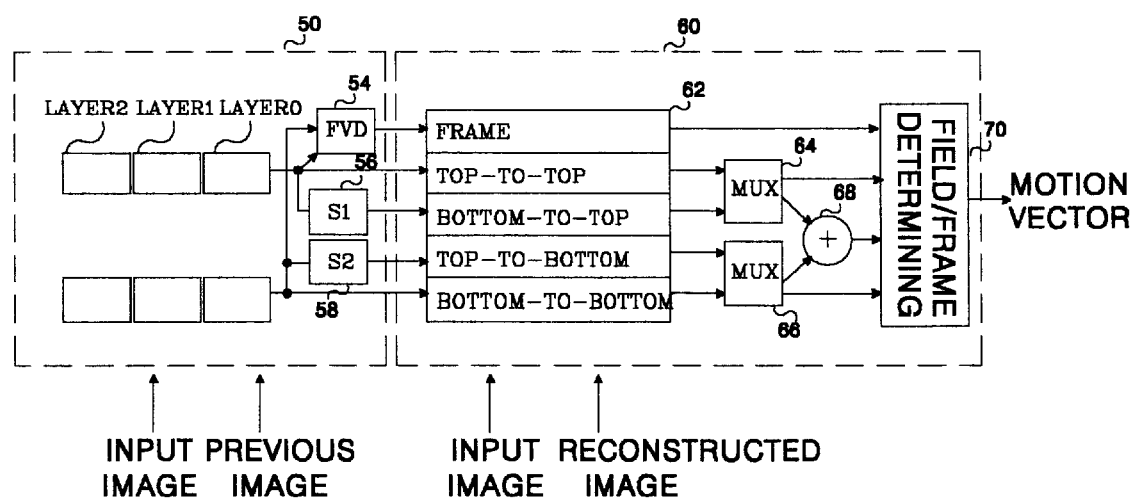
FIG. 15 is a block diagram showing the configuration of a motion prediction apparatus according to a fourth embodiment of the present invention.

Referring now to FIG. 15, there is shown a motion prediction apparatus employing the hierarchical block matching algorithm according to a fourth embodiment of the present invention. In the motion prediction apparatus, a first motion estimator 50 detects a single-pixel motion vector by utilizing the hierarchical block matching algorithm. The first motion estimator 50 performs the motion prediction hierarchically at the layers 2, 1 and 0 to detect first and second single-pixel motion vectors. Then, a frame vector detector 54 included in the first motion estimator 50 detects a third single-pixel motion vector on a basis of the first and second single-pixel motion vectors detected from the layer 1. First and second scalers 56 and 58 detects fourth and fifth single-pixel motion vectors by carrying out a motion scaling with respect to the first and second single-pixel motion vectors. The second motion estimator 60 detects a motion vector in a half pixel unit by utilizing the first to fifth single-pixel motion vectors inputted from the first motion estimator 50.

As described above, the motion prediction apparatus according to the present invention is capable of reducing a calculation amount required for the motion prediction itself in a single pixel unit for a single path even when a motion prediction in a single pixel unit is done by employing a hierarchical block matching algorithm.

The following Table 1 represents an average PSNR obtained by the conventional motion prediction method and each of averages PSNR obtained by the motion prediction methods according to the third and fourth embodiments of the present invention with respect to each image type so as to examine a motion prediction performance of the present motion prediction method.

TABLE 1

| IMAGE | MOTION PREDICTION METHODS OF FIG. 12 PSNR (dB) | MOTION PREDICTION METHODS OF FIG. 14 PSNR (dB) | MOTION PREDICTION METHODS OF FIG. 15 PSNR (dB) |
| --- | --- | --- | --- |
| Ballet | 44.6 | 44.5 (−0.1) | 44.5 (−0.1) |
| Bicycle | 30.7 | 30.5 (−0.2) | 30.5 (−0.2) |
| Bus | 34.0 | 33.8 (−0.2) | 33.8 (−0.2) |
| Cheerleaders | 31.9 | 31.7 (−0.2) | 31.7 (−0.2) |
| Confetti | 33.9 | 33.7 (−0.2) | 33.7 (−0.2) |
| Flower garden | 32.2 | 32.2 (−0.0) | 32.2 (−0.0) |
| Football | 34.2 | 34.1 (−0.1) | 34.1 (−0.1) |
| Mix | 33.8 | 33.7 (−0.1) | 33.7 (−0.1) |
| Mobile and calendar | 29.9 | 29.8 (−0.1) | 29.8 (−0.1) |
| Popple | 33.3 | 33.1 (−0.2) | 33.1 (−0.2) |
| Susie | 42.6 | 42.6 (−0.0) | 42.6 (−0.0) |
| Tempete | 33.3 | 33.2 (−0.1) | 33.2 (−0.1) |
| Tennis | 34.0 | 34.0 (−0.0) | 34.0 (−0.0) |

In the table 1, the used images are 13 types of MPEG-2 standard image undergoing the coding/decoding process. Specifically, they are ballet, bicycle, bus, cheerleaders, confetti, flower garden, football, mix, mobile and calendar, Popple, susie, tempete, and tennis images. Each image has a frame speed of 30 frame/sec, and the pixel number of each image is 720×480 pixels. The methods selected to compare the performance of motion prediction employ the hierarchical block matching algorithm, and which is the conventional motion prediction method shown in FIG. 12 and motion prediction methods according to the third and fourth embodiments shown in FIG. 14 and FIG. 15, respectively. The averages PSNR for each image obtained by applying the three motion prediction methods to be compared to a software of MPEG-2 image are shown in Table 1. The averages PSNR are defined by the following formula:

$$PSNR_{average} = \frac{1}{150}\sum_{i=1}^{150} PSNR_{frame}(i) \tag{13}$$

$$PSNR_{frame}(i) = 10\ \log_{10}\frac{255^2}{MSE}$$

$$MSE = \frac{1}{H \times V}\sum_{j=0}^{V-1}\sum_{k=0}^{H-1}\left(I(i,k) - \hat{I}(j,k)\right)^2$$

wherein $I(j,k)$, $\hat{I}(j,k)$, H and V represents an original image, a coded/decoded image, the horizontal pixel number of image and the vertical pixel number of image, respectively. In parameter values applied for a coding/decoding, a size N of image group is equal to 12 frame, a frame distance M between the I or P picture and the p picture is equal to 2, and a bit transfer rate T of compressed image is equal to 6 Mbps. As seen from Table 1, the present motion prediction method employing the hierarchical block matching algorithm has a performance approximated to the conventional motion prediction method even when its calculation amount is reduced to ¼.

As described above, the motion prediction apparatus and method according to the present invention detects motion vectors by carrying out the motion prediction operation for only two paths during the motion prediction in a single pixel and, thereafter, detects motion vectors for the remaining paths by scaling the two motion vectors, so that its calculation amount for the motion prediction in a single pixel unit can be reduced to ¼ compared with the prior art. Also, the motion prediction apparatus and method according to the present invention employs the hierarchical block matching algorithm, thereby still more reducing a calculation amount required in the motion prediction in a single pixel unit for a single path. Moreover, the motion prediction apparatus and method according to the present invention is capable of preventing a deterioration in the performance of motion prediction caused by the reduced calculation amount.

Although the present invention has been explained by the embodiments shown in the drawings described above, it should be understood to the ordinary skilled person in the art that the invention is not limited to the embodiments, but rather than that various changes or modifications thereof are possible without departing from the spirit of the invention. Accordingly, the scope of the invention shall be determined only by the appended claims and their equivalents.

What is claimed is:

1. A motion prediction apparatus for predicting a motion in coding an input image, comprising:
   first motion estimating means for retrieving a previous image to perform motion estimating to predict a single-pixel motion vector in a top-to-top field path and in a bottom-to-bottom field path with respect to the input image;
   frame vector determining means for determining a frame motion vector on a basis of motion vectors outputted from the first motion estimating means;
   scaling means for scaling one of the top-to-top and the bottom-to-bottom single-pixel motion vectors received from the first motion estimating means to determine a single-pixel motion vector in a third field path; and
   second motion estimating means for retrieving a decoded image on a basis of each single-pixel motion vector outputted from the first motion estimating means, the frame vector determining means and the scaling means, wherein the third field path is at least one of a bottom-to-top field path and a top-to-bottom field path.

2. The motion prediction apparatus as claimed in claim 1, wherein the frame vector determining means determines the frame motion vector by averaging the motion vectors.

3. The motion prediction apparatus as claimed in claim 1, wherein the second motion estimating means includes field/frame determining means for comparing a motion compensation error in the frame with that in the field to thereby select and output the smaller compensating error.

4. The motion prediction apparatus as claimed in claim 1, wherein the scaling means comprises:
   first scaling means for multiplying the single-pixel motion vector in the top-to-top field path outputted from the first motion estimating means by a certain scaling factor to provide a single-pixel motion vector in a bottom-to-top field path; and
   second scaling means for multiplying the single-pixel motion vector in the bottom-to-bottom field path outputted from the first motion estimating means by a certain scaling factor to provide a single-pixel motion vector in a top-to-bottom field path.

5. The motion prediction apparatus as claimed in claim 4, wherein the scaling means determines the scaling factor depending upon a picture type, a motion prediction direction and a distance between the fields related to this direction, wherein a motion of an object between the continuous fields is a uniform velocity motion.

6. The motion prediction apparatus of claim 1, wherein the scaling means uses the single-pixel motion vectors to determine the single-pixel motion vector for the third field path without using the previous image.

7. The motion prediction apparatus of claim 1, wherein a fourth field path is the other of the bottom-to-top field path and the top-to-bottom field path.

8. The motion prediction apparatus of claim 1, wherein the scaling means comprises first scaling means for multiplying the single-pixel motion vector in the top-to-top field path outputted from the first motion estimating means by a certain scaling factor detect a single-pixel motion vector in a bottom-to-top field path.

9. The motion prediction apparatus of claim 1, wherein the scaling means determines the single-pixel motion vector for the third field path without using the first motion estimating means and second motion estimating means.

10. A motion prediction method of predicting a motion in coding an input image, comprising:
    detecting motion vectors by retrieving a previous image to predict motions in a single pixel unit in a top-to-top field path and in a bottom-to-bottom field path with respect to the input image;
    determining a frame motion vector on a basis of the top-to-top and bottom-to-bottom field path motion vectors;
    scaling at least one of the top-to-top and bottom-to-bottom field path motion vectors to determine a single pixel motion vector for a different third field path; and
    detecting a motion vector in a half pixel unit by retrieving a decoded image on a basis of a single-pixel frame motion vector and the field path motion vectors.

11. The motion prediction method as claimed in claim 10, further comprising:
    comparing a motion compensation error in half pixel motion vector based on the frame motion vector with that in half pixel motion vectors based on the single pixel field path motion vectors to thereby select and output the smaller compensating error.

12. The motion prediction method as claimed in claim 10, wherein the frame motion vector is obtained by averaging the field path motion vectors.

13. The motion prediction method as claimed in claim 10, wherein the scaling comprises:
    multiplying the motion vector in the single pixel unit in the top-to-top field path by a first scaling factor to provide a single-pixel motion vector in a bottom-to-top field path; and
    multiplying the motion vector in the single pixel unit in the bottom-to-bottom field path by a second scaling factor to provide a single-pixel motion vector in a top-to-bottom field path.

14. The motion prediction method as claimed in claim 13, wherein the scaling factors are variably determined depending upon a picture type, a motion prediction direction and a distance between the fields related to this direction, wherein a motion of an object between the continuous fields is a uniform velocity motion.

15. The motion prediction method of claim 10, wherein the scaling does not perform a pixel by pixel determination of a plurality of single-pixels to determine the single-pixel motion vector for the third field path.

16. A motion prediction method of performing a motion prediction by dividing a hierarchical structure in coding an input image, comprising:

(A) detecting a single-pixel motion vector by predicting a motion in a single pixel unit in at least one top layer hierarchically with respect to a top-to-top field path and a bottom-to-bottom field path of an input image and a previous image having n(n≧2) layers having a different size of retrieval areas, said n being an integer;

(B) determining a frame motion vector on a basis of the single-pixel top-to-top and bottom-to-bottom field path motion vectors, and scaling each of the single-pixel top-to-top and bottom-to-bottom field path motion vectors to determine single-pixel third and fourth field path motion vectors, wherein the third field path is at least one of a bottom-to-top field path and a top-to-bottom field path;

(C) detecting a final single-pixel motion vector in one of m layers by repeatedly predicting a motion in a single pixel unit hierarchically at the m(1<m≦n) layers next to the n layer on a basis of the motion vectors in the steps (A) and (B); and (D) predicting a motion in a half pixel unit by retrieving a decoded image on a basis of the single-pixel motion vector detected in the step (C).

17. The motion prediction method as claimed in claim 16, wherein the scaling comprises:

multiplying the single-pixel motion vector in the top-to-top path by a first certain scaling factor to provide a single-pixel motion vector in the third field path, the third field path being a bottom-to-top path; and multiplying the single-pixel motion vector in the bottom-to-top field path by a second certain scaling factor to provide a single-pixel motion vector in the fourth field path, the fourth field path being a top-to-bottom field path.

18. A motion prediction method of performing a motion prediction by dividing a hierarchical structure in coding an input image, comprising:

(A) detecting a single-pixel motion vector by repeatedly predicting a motion in a single pixel unit in at least two top layers of a plurality of layers hierarchically with respect to a top-to-top field path and a bottom-to-bottom field path of an input image and a previous image of n(n≧2) layers having a different size of retrieval areas, said n being an integer;

(B) determining a frame motion vector on a basis of the single-pixel top-to-top and bottom-to-bottom field path motion vectors, and scaling each of the single-pixel top-to-top and bottom-to-bottom field path motion vectors to determine single-pixel third and fourth field path motion vectors, wherein the third field path is at least one of a bottom-to-top field path and a top-to-bottom field path; and (C) predicting a motion in a half pixel unit by retrieving a decoded image on a basis of the single-pixel frame motion vector and the top-to-top, bottom-to-bottom, third and fourth field path motion vectors detected.

19. The motion prediction method of claim 18, wherein the scaling comprises:

multiplying the single-pixel motion vector in the top-to-top field path by a first certain scaling factor to provide a single-pixel motion vector in the third field path, the third field path being a bottom-to-top field path; and multiplying the single-pixel motion vector in the bottom-to-bottom field path by a second certain scaling factor to provide a single-pixel motion vector in the fourth field path, the fourth field path being a top-to-bottom field path.

20. A motion prediction apparatus for predicting a motion in coding an input image, comprising:

a first motion estimator that retrieves a previous image to predict a single-pixel motion in a first field path and in a second field path with respect to the input image, wherein the single-pixel motion is represented in a single-pixel first field path motion vector and a single-pixel second field path motion vector;

a scaler circuit that arithmetically operates the field path motion vectors outputted from the first motion estimator by a respective first and second scaling factor for scaling to determine a single-pixel field path motion vector in each of a third field path and a fourth field path; and a second motion estimator that retrieves a decoded image according to each single-pixel motion vector outputted from the first motion estimator and the scaler circuit, wherein the first, second, third and fourth field paths are different ones respectively of a top-to-top, top-to-bottom, top-to-bottom and bottom-to-top field path.

21. The motion prediction apparatus of claim 20, wherein the scaler circuit comprises a first scaler that multiplies the single-pixel motion vector in the first field path outputted from the first motion estimator by a first prescribed factor to detect the single-pixel motion vector in the third field path.

22. The motion prediction apparatus of claim 20, wherein the first, second, third and fourth field paths are the top-to-top field path, the bottom-to-bottom field path, the bottom-to-top field path and the top-to-bottom field path, respectively.

23. A motion prediction method of predicting a motion in coding an input image, comprising:

(A) first motion estimating using detected motion vectors by retrieving a previous image to predict motions in a single pixel unit in a top-to-top field path and in a bottom-to-bottom field path to determine single-pixel bottom-to-bottom and top-to-top field path motion vectors that match a current block in the input image using a prescribed criteria;

(B) scaling the single-pixel bottom-to-bottom and top-to-top field path motion vectors to determine field path motion vectors for at least one of a bottom-to-top field path and a top-to-bottom field path without detecting single-pixel motion vectors for a plurality of pixels in the previous image for comparison with the current block with respect to said at least one of the bottom-to-top field path and the top-to-bottom field path; and (C) second motion estimating using a detected motion vector in a half pixel unit by retrieving a decoded image on a basis of the single-pixel top-to-top, bottom-to-bottom, and said at least one of the top-to-bottom and the bottom-to-top field path motion vectors in the steps (A) and (B).

24. The motion prediction method of claim 23, wherein the first motion estimating retrieves a selected block from the previous image to match the current block in the input image by estimating and comparing single-pixel motion vectors for a plurality of single pixels to detect the single-pixel top-to-top field path and the bottom-to-bottom field path motion vectors with respect to the current block, and wherein the scaling the top-to-top field path motion vector and the bottom-to-bottom field path motion vector to determine a single-pixel third and fourth field path motion vectors, respectively, for the current block in the input image is performed without additional estimating and comparing the single-pixel motion vectors for the plurality of single pixels to the current block.

* * * * *